2 Sheets--Sheet 2.

W. M. & G. H. HOWE.
Harvester-Rakes.

No. 147,840. Patented Feb. 24, 1874.

Witnesses:
Chas. Nida
C. Sedgwick

Inventor:
W. M. Howe
G. H. Howe
Per
[signature]
Attorneys.

AM. PHOTO-LITHOGRAPHIC CO. N.Y. (OSBORNE'S PROCESS.)

UNITED STATES PATENT OFFICE.

WILLIAM M. HOWE AND GEORGE H. HOWE, OF LANSING, MINNESOTA.

IMPROVEMENT IN HARVESTER-RAKES.

Specification forming part of Letters Patent No. 147,840, dated February 24, 1874; application filed September 6, 1873.

*To all whom it may concern:*

Be it known that we, WM. M. and G. H. HOWE, of Lansing, in the county of Mower and State of Minnesota, have invented a new and useful Improvement in Raking Attachment to Harvesters, of which the following is a specification:

The improvement in the raking apparatus consists of teeth arranged to project from the rake-head up through slots in the apron, and to swing down horizontally at the beginning of the backward movement to pass under the grain accumulated on the platform during the forward movement, and then swing up and be locked automatically at the beginning of the forward motion, so as to carry the grain forward.

Figure 1:
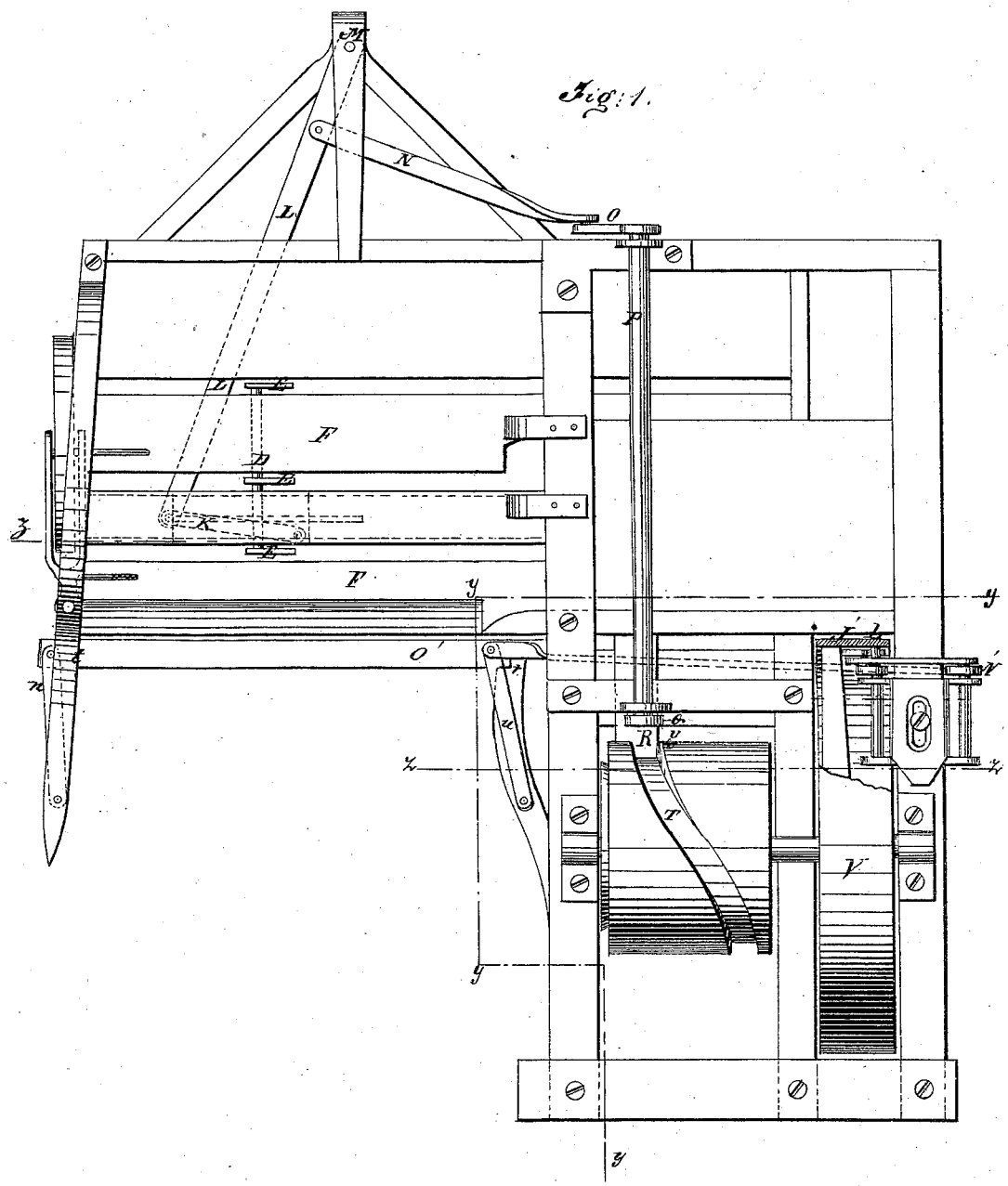
Figure 2:
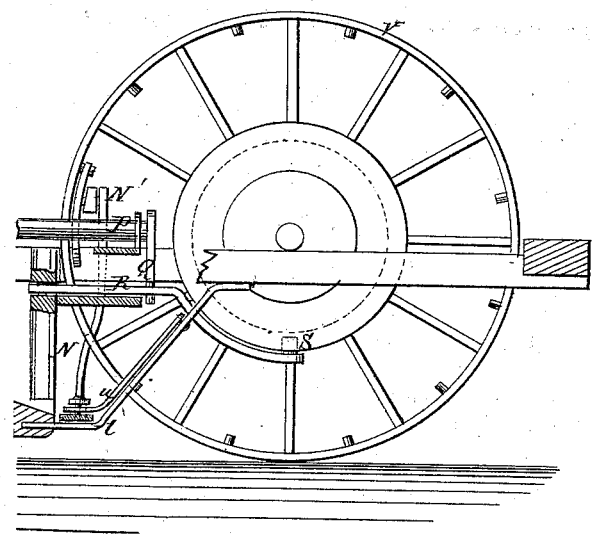
Figure 3:
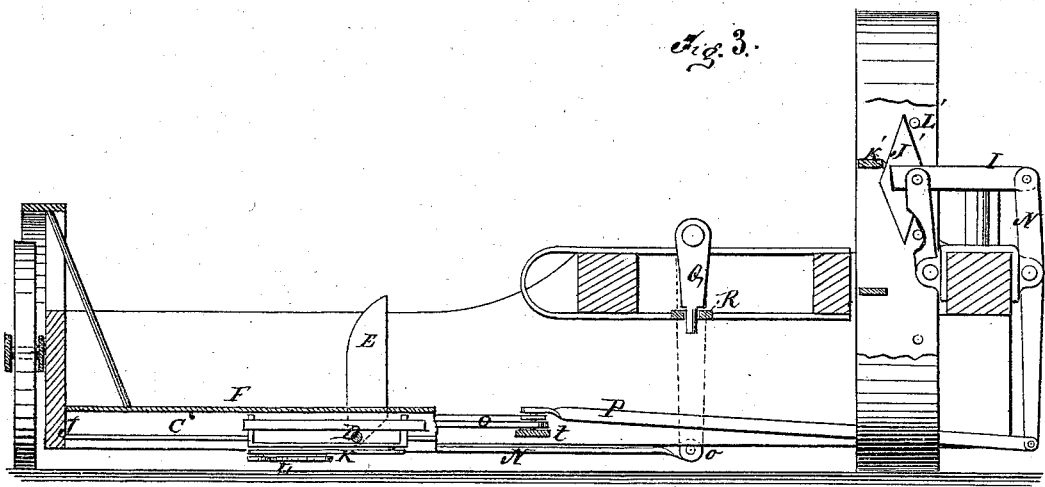

Figure 1 is a plan view. Fig. 2 is a vertical section. Fig. 3 is a longitudinal sectional elevation; and Fig 4, a longitudinal vertical section of rake and part of platform.

Similar letters of reference indicate corresponding parts.

Figure 4:
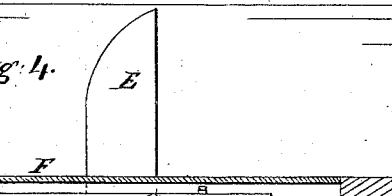

A represents a metal plate with the ends B bent up at right angles to it, and fitted, as shown in Fig. 3, to the way C, under the platform, to slide forward and backward, while being securely confined in said way. Above this plate, but below the way C, is the rake-head, consisting of a shaft, D, with the rake-teeth E attached to it. Said shaft extends across the plate in the transverse direction of the platform F, and is fitted in bearings on the plate, so as to revolve to turn the teeth up into the working position, and down again. G is a short arm rigidly attached to the shaft D, and jointed at its free end to a link, H, which is jointed to a sliding bar, I, a little longer than plate A, and supported in the ends B, of said plate having mortises through which it passes, so as to project at each end beyond said plate, as shown in Fig. 4. This bar strikes against the ends J of the raceway before the plate A and the rake-stop, to shift the teeth down and up, as represented in Fig. 3, which is the position when the rake is carrying the grain forward to the right. The bar, being arrested at the right-hand end of the race, will swing link H back, which will pull arm G up, and throw the teeth down backward to the position for going back under the grain. Just before stopping in the backward movement the bar I, being arrested as before by that end of the race, will throw the link H forward, the arm G downward, and the fingers upward into the position represented in Fig. 3, ready to rake the grain forward again. It will be seen that the link H stands at right angles to the bar I, so that the teeth are locked against being forced down by the resistance upon them, as the force, no matter how great it is, is delivered by link H, upon bar I, exactly at right angles to the direction in which it moves, so that it cannot be shifted by said force.

To operate the rake, it is connected by link K with the lever L, which is pivoted at M, and connected near said pivot by rod N, with the arm O, of a rock-shaft, P, which has an arm, Q, extending down through a bar, R, pivoted to the frame at one end, and at the other end, S, fitted into the groove T of the cam U on the axle of the traction-wheel V. These contrivances cause the rake to move forward once at each revolution of the traction-wheel, and gather up the grain into a gavel, and deliver it to the binding-rope and the compressing-arm.

Having thus described our invention, we claim as new and desire to secure by Letters Patent—

1. The combination of the shifting-bar I, link H, and arm G, with the tilting-rake D E, and the reciprocating carrier A, substantially as specified.

2. The vibrating bar R, arm Q, rock-shaft P, crank-arm O, link N, arm L, and link K, combined with the rake-carrier A, and the cam T, substantially as specified.

WILLIAM M. HOWE.
GEORGE H. HOWE.

Witnesses:
H. A. HOLMES,
A. B. VAUGHAN.